(12) United States Patent
Knueppel et al.

(10) Patent No.: US 8,632,334 B2
(45) Date of Patent: Jan. 21, 2014

(54) APPARATUS FOR BLOW MOLDING

(75) Inventors: Harald Knueppel, Belle River (CA); Steve L. Toth, Windsor (CA)

(73) Assignee: TI Group Automotive Systems, L.L.C., Auburn Hills, MI (US)

( * ) Notice: Subject to any disclaimer, the term of this patent is extended or adjusted under 35 U.S.C. 154(b) by 84 days.

(21) Appl. No.: 13/464,276

(22) Filed: May 4, 2012

(65) Prior Publication Data

US 2012/0219661 A1 Aug. 30, 2012

Related U.S. Application Data (60) Division of application No. 10/912,665, filed on Aug. 5, 2004, now Pat. No. 8,197,744, which is a continuation-in-part of application No. 10/646,677, filed on Aug. 22, 2003, now abandoned.

(51) Int. Cl.
| | |
|---|---|
| *B29C 49/00* | (2006.01) |
| *B28B 1/00* | (2006.01) |
| *B41B 11/54* | (2006.01) |
| *B29C 39/02* | (2006.01) |

(52) U.S. Cl.
USPC ............ 425/536; 425/450.1; 425/451.9; 425/522; 425/535; 249/160; 249/161; 249/162

(58) Field of Classification Search
USPC .......... 425/450.1, 451.9, 522, 523, 535, 536; 249/160, 161, 162
See application file for complete search history.

(56) References Cited

U.S. PATENT DOCUMENTS

| | | |
|---|---|---|
| 3,711,233 A | 1/1973 | Uhlig |
| 3,941,542 A | 3/1976 | Uhlig et al. |
| 4,086,314 A | 4/1978 | Lampart et al. |
| 4,092,392 A | 5/1978 | Dunbeker |
| 4,188,179 A | 2/1980 | Linss et al. |
| 4,199,129 A | 4/1980 | Fischer |
| 4,717,523 A | 1/1988 | Evely |
| 4,895,743 A | 1/1990 | Peters |
| 5,026,268 A | 6/1991 | Lee |
| 5,198,174 A | 3/1993 | Nakagawa et al. |
| 5,240,402 A | 8/1993 | Ingram |
| 5,282,736 A | 2/1994 | Moore |
| 5,411,699 A | 5/1995 | Collette et al. |
| 5,750,067 A | 5/1998 | Hellbrugge |
| 2001/0013516 A1 | 8/2001 | Boecker |
| 2002/0171161 A1 | 11/2002 | Belcher |

FOREIGN PATENT DOCUMENTS

WO  WO 2004/054782 A1  1/1990

OTHER PUBLICATIONS

EP Application No. 04 019 305.4-2307 Official Letter of Jun. 22, 2006.
EP Application No. 04 019 305.4-2307 Official Letter of Mar. 19, 2007.

*Primary Examiner* — Atul P. Khare

(74) *Attorney, Agent, or Firm* — Reising Ethington P.C.

(57) ABSTRACT

A method and apparatus for blow molding an article wherein a parison is positioned between substantially opposed mold closures. The opposed mold closures and at least one other mold closure are advanced, wherein the at least one other mold closure is advanced into abutment with at least one of another of the substantially opposed mold closures, and another of the at least one other mold closure. Thereafter, a gas may be injected within the interior of the parison to form a molded article, the mold closures retracted along their respective axes, and the molded article removed.

10 Claims, 12 Drawing Sheets

APPARATUS FOR BLOW MOLDING

REFERENCE TO RELATED APPLICATION

This is a divisional application of copending U.S. patent application Ser. No. 10/912,665, filed on Aug. 5, 2004, and now U.S. Pat. No. 8,197,744, granted on Jun. 12, 2012, which is a continuation-in-part of U.S. patent application Ser. No. 10/646,677, filed on Aug. 22, 2003 and now abandoned. Applicants and their assignee claim the benefit of these earlier filed applications under 35 U.S.C. §§120 & 121.

FIELD OF THE INVENTION

This invention relates generally to molding processes and apparatuses and more particularly to plastic blow molding processes and apparatuses.

BACKGROUND OF THE INVENTION

Figure 1:
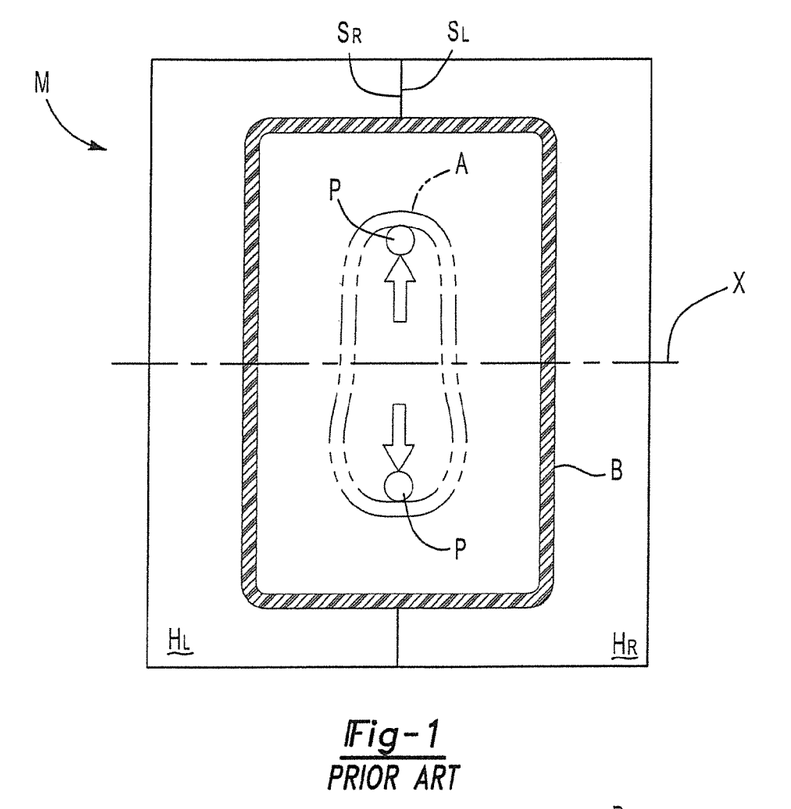
FIG. 1 is a cross-sectional view of a blow molding apparatus in accordance with the prior art.

Blow molding is a well known method for producing a variety of plastic products, particularly hollow vessels including fuel tanks, containers, and the like. As depicted in FIG. 1, a blow molding process and apparatus M typically involves spreading portions of a heated pre-formed plastic article A between two spreader pins P. As shown, blow molding processes almost universally involve molding the hot pre-formed article A between two mold halves Hl and Hr, which open away from one another and close together along a single axis X.

One variation on this concept is disclosed in U.S. Pat. No. 5,198,174 to Nakagawa et al. Nakagawa et al is directed toward the problems associated with forming a radially extended flange portion at one end of a hollow plastic product, such as a flanged pipe. Nakagawa et al. asserts that it is nearly impossible to simultaneously and integrally blow mold a tubular portion with a hollow head or a radially extending flange portion at one end of the tubular portion due to unacceptable thinning of the material at the corners of the flange portion. Therefore, Nakagawa et al instead teach a method of blow molding the tubular portion and then injection molding a solid radially extending flange portion on the tubular portion. Nakagawa et al disclose a blow mold having a pair of mold closures or mold halves that close toward one another along an axis. Each of the mold halves includes a recess and a mating surface. When the mold halves come toward one another, their respective mating surfaces engage one another to close the mold. In other words, the closed mold is established by the closure of the mold halves together such that the mating surfaces engage. A first mold cavity is defined not only by the recesses of the mold halves, but also by movable mold segments that are mounted within the mold halves and that are moved to an advanced position within the mold halves. The first mold cavity is provided to blow mold the tubular portion of the hollow article. A second mold cavity is defined by the movable mold segments when they are moved to a retracted position within the mold halves. The second mold cavity is provided to injection mold the solid flange portion of the hollow article.

Another variation is disclosed in U.S. Patent Application Publication 2002/0171161 to Belcher. Belcher identifies several problems with combining blow molding and injection molding operations to form a single hollow article, such as a bottle with a handle. Belcher teaches a method of blow molding a bottle and thereafter pinching side walls of the blown bottle so as to bond adjacent interior wall surfaces together to form the handle. Belcher discloses a blow mold having two mold closures; a front half section and a rear half section that define the front and rear of the bottle and traverse toward one another along an axis. Both half sections have mating surfaces that engage one another to close the mold and define a mold cavity, wherein the bottle is expanded or blown. A movable mold segment is mounted within each of the half sections to move along an axis that is parallel to the closure axis. The movable mold segments are linearly opposed and move toward one another from a retracted position to an advanced position to pinch opposed portions of the blown bottle together to form an integral handle.

Figure 2:
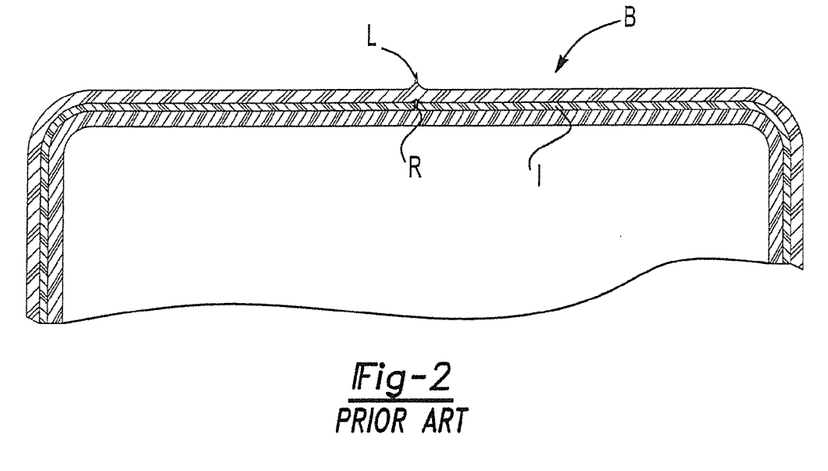
FIG. 2 is a partial cross-sectional view of a prior art blow molded component manufactured using the prior art apparatus of FIG. 1.

Thus, the Nakagawa et al and Belcher references both teach the conventional method of closing a mold by bringing two mold closures or mold halves together. Unfortunately, however, the use of two mold halves to close a blow mold has some drawbacks. Referring again to FIG. 1, mold halves Hl and Hr engage one another along mating engagement surfaces Sl and Sr in a closed position as shown. During a blowing step, relatively large portions of the pre-formed article A tend to get pinched between the mating engagement surfaces Sl and Sr of the mold halves Hl and Hr, which is an undesirable condition. As shown in FIG. 2, this pinching phenomenon creates a heavy parting line L in a finished blow molded article B. Pinching of pre-formed material and resulting heavy parting lines are especially problematic when blow molding a multi-layer article, such as that shown, which includes a relatively thin and fragile inner membrane I. Due to the pinching of the pre-formed article between the mold halves, such membranes can become ruptured in various places along the parting line, as shown by rupture R. Ruptured membranes are undesirable, especially when the purpose of such membranes is to prevent vapor permeation through the wall of the finished blow molded article. Specifically, hydrocarbon vapors can escape to atmosphere through the walls of a fuel tank through such ruptured membranes.

Another problem associated with conventional blow molding processes and apparatuses involves unnecessarily high stretch ratios of pre-formed articles. In other words, conventional blow molding typically involves using parisons or pre-formed articles, wherein portions thereof must be blown or expanded to two to three times their original size in order to achieve the final dimensions of the finished blow molded article. Accordingly, some portions of the pre-formed article will experience a high stretch ratio, thereby resulting in significant thinning of the wall thickness of those portions, as discussed in the Nakagawa et al. reference. In contrast, other portions of the pre-formed article will experience a low-stretch ratio, thereby resulting in relatively little thinning. This significant difference in stretch ratios over the entirety of the pre-formed article tends to result in a finished blow-molded component with a wall thickness distribution that is substantially non-uniform.

SUMMARY OF THE INVENTION

A method of blow molding an article from a parison within a blow mold, including the steps of providing substantially opposed mold closures and at least one other mold closure; positioning a parison between the substantially opposed mold closures; and advancing the substantially opposed mold closures and the at least one other mold closure, including advancing the at least one other mold closure into abutment with at least one of: another of the substantially opposed mold closures, and another of the at least one other mold closure.

A method of blow molding an article which generally includes the steps of positioning a parison between three or more mold closures, advancing the mold closures along two or more axes to close the mold closures around the parison, and blow molding the parison to produce the article. More specifically, the method of making the article may include the steps of: positioning a parison between multiple mold closures; advancing one or more of the multiple mold closures along a first axis and advancing one or more other of the multiple mold closures along another axis, which is generally transverse to the first axis; injecting a gas within the interior of the parison; retracting the mold closures along their respective axes; and removing a molded article formed from the parison. Articles are also produced by the processes described above.

An apparatus for blow molding an article from a parison is provided. The apparatus includes substantially opposed mold closures that are movable between open and closed positions. At least one other mold closure is translatably mounted to at least one of the substantially opposed mold closures. The at least one other mold closure is movable between open and closed positions, and into abutment with at least one of another of the substantially opposed mold closures, and another of the at least one other mold closure.

Preferably, the apparatus includes first and second opposed mold closures that are movable between open and closed positions along an axis. The apparatus further includes one or more other mold closures that are translatably mounted to the first and second opposed mold closures and are movable between open and closed positions along another axis.

Objects, features, and advantages of this invention include providing an apparatus and method for producing an article that improves the surface quality and internal integrity of a blow molded article, reduces the hydrocarbon permeability of a blow molded fuel tank, reduces the stretch ratio of a blow molding operation, enables blow molding of flange portions, enables use of a relatively larger parison than before possible, eliminates the need to use pinch plates and pre-blowing, better facilitates the blow molding of a fuel tank around a carrier to produce a "Ship-In-a-Bottle" article that is of relatively simple design, economical manufacture and assembly, and has a long service life.

BRIEF DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENTS

Figure 3A:
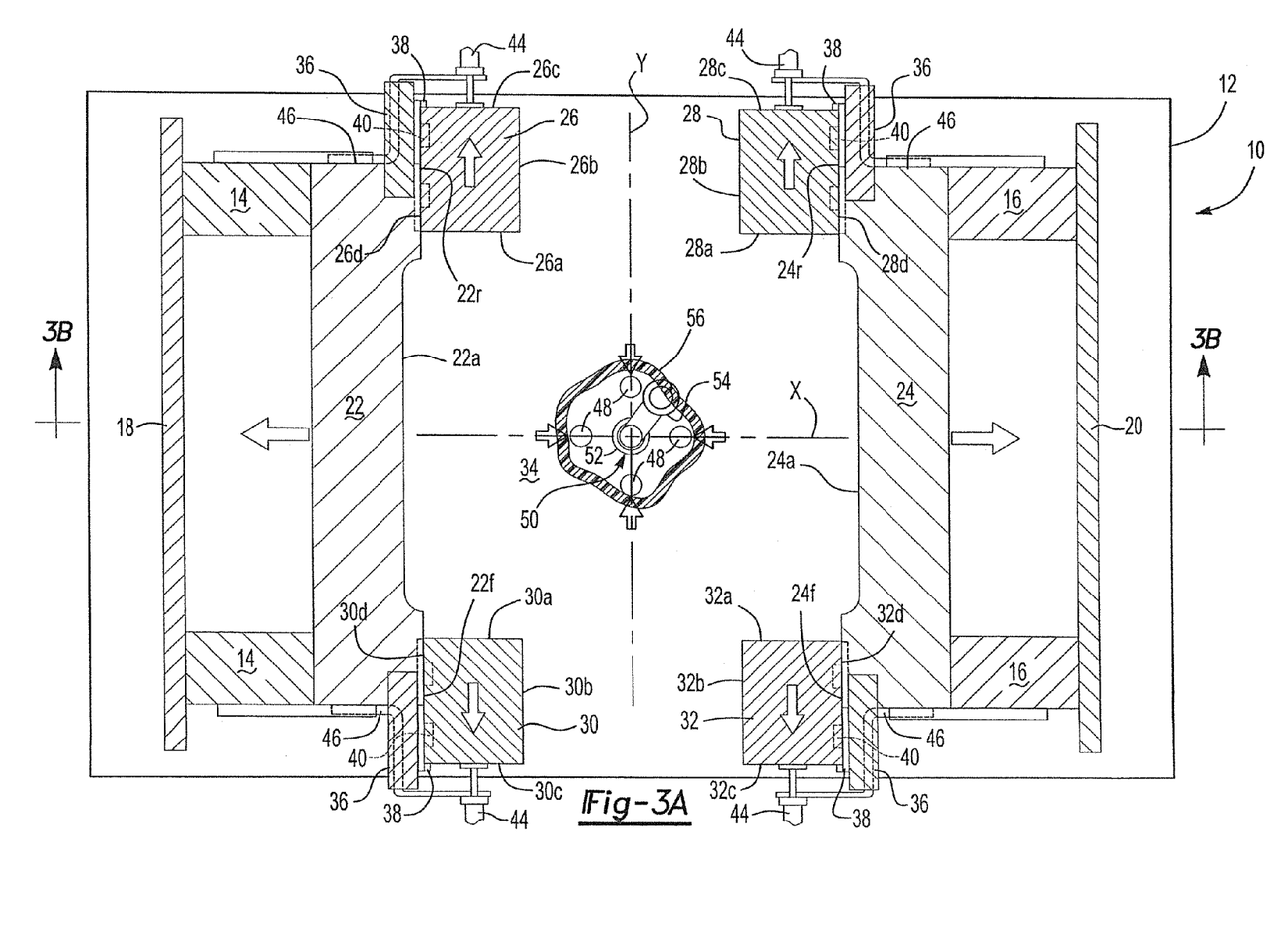
FIG. 3A is a partial cross-sectional view of a blow molding apparatus in an open or retracted position, according to an embodiment of the present invention.

Referring in detail to the drawings, FIG. 3A illustrates a blow molding apparatus 10 of the invention, which is constructed for use with a blow molding machine 12. The blow molding apparatus 10 is depicted in cross section, looking downward along a Z axis with an X axis extending left to right and a Y axis extending rear to front. As defined herein, X, Y, and Z are orthogonal axes and each axis represents a relative direction, rather than a specific line along that direction. Moreover, the terms left, right, front, and rear are used as an expedient for more clearly explaining the present invention, and are not to be interpreted as limiting the present invention to the orientations described herein. The blow molding apparatus 10 includes left and right base frames 14 and 16 that are attached to left and right movable platens or mold closers 18 and 20 of the blow molding machine 12. The base frames 14 and 16 may be constructed in an open space frame configuration as is well known in the art, such as from a weldment or a casting, such that hydraulic lines, coolant lines, and the like can be routed therethrough. Likewise, the mold closers 18 and 20 are well-known in the art and are typically component parts of the blow molding machine 12 that are activated hydraulically.

Unlike prior art blow molding apparatuses that only include two opposed movable mold halves, the blow molding apparatus 10 of the present invention includes a plurality of movable mold closures or segments, which are shown in FIG. 3A in a retracted or open position. The plurality of movable mold segments includes a left mold segment 22 mounted on the left base frame 14 and a right mold segment 24 mounted on the right base frame 16. Accordingly, the mold closers 18 and 20 are capable of traversing the left and right mold segments 22 and 24 between open and closed positions along the X axis. Rear and front left mold segments 26 and 30 are slidably mounted to the left segment 22, and rear and front right mold segments 28 and 32 are slidably mounted to the right segment 24. Thus, the rear and front mold segments 26, 28 and 30, 32 are slidable between open and closed positions along the Y axis. As shown, the rear and front mold segments 26, 28 and 30, 32 move perpendicularly transverse to the X axis motion of the left and right mold segments 22, 24. However, the mold segments 22, 24, 26, 28, 30, 32 may move in any generally oblique or transverse directions with respect to one another. Each of the mold segments 22, 24, 26, 28, 30, 32 is preferably jacketed with cooling passages therethrough as is well known in the art.

The rear and front mold segments 26, 28 and 30, 32 need not be mounted to their respective left and right mold segments 22 and 24, but instead could be separately mounted to the blow molding machine 12, such as by rear and front mold closers (not shown), similar to the left and right mold closers 18 and 20. While this specific mounting configuration of the mold segments and closures of the present invention is particularly cost effective, it is contemplated that other, more complex mold segments and closure arrangements could be provided and still fall well within the scope of the present invention. For example, three or more mold segments could be arranged radially with respect to a common center, wherein the mold segments advance radially inwardly toward the common center.

In any case, each of the left and right mold segments 22 and 24 includes mold surfaces 22a and 24a, which partially define a mold cavity 34. The mold cavity 34 is further defined by mold surfaces 26a, 28a, 30a, and 32a of respective mold segments 26, 28, 30, 32. Likewise, all of the mold segments 22, 24, 26, 28, 30, 32 collectively define a mold of the present invention. The rear and front mold segments 26, 28, 30 and 32 also include abutment surfaces 26b, 28b, 30b, and 32b; driven surfaces 26c, 28c, 30c, and 32c; and sliding surfaces 26d, 28d, 30d, and 32d. Likewise, left and right mold segments 22 and 24 include sliding surfaces 22r, 22f, and 24r, 24f for respective sliding engagement with sliding surfaces 26d, 30d, and 28d, 32d.

The rear mold segments 26 and 28, and the front mold segments 30 and 32, are slidably mounted to respective portions of the left and right mold segments 22 and 24 using an interlocking guide rail arrangement. Interlocking guide rail arrangements are well known in the art of machine and tool design. In any case, guide rail support blocks 36 are T-jointed and fastened to respective portions of the left and right mold segments 22 and 24. The guide rail support blocks 36 are provided for supporting guide rails 38 thereon such as STAR brand guide rails. The guide rails 38 are mounted to and fastened atop the support blocks 36 and the respective sliding surfaces 22r, 22f, 24r, 24f of the left and right mold segments 22 and 24. The guide rails 38 interengage with runner blocks 40 such as STAR brand standard runner blocks, which are mounted to and fastened within channels (not shown), which are milled into respective sliding surfaces of the mold segments. Accordingly, the rear and front mold segments 26, 28, 30, 32 are slidable fore and aft along the Y axis.

To slide the rear and front mold segments 26, 28, 30, 32 along the Y axis, hydraulic cylinders 44 such as HEB brand cylinders are mounted to the driven surfaces 26c, 28c, 30c, and 32c of the rear and front mold segments 26, 28, 30, 32, preferably by a clevis arrangement (not shown). The hydraulic cylinders 44 are preferably of a self-locking type and are supported by weldment brackets 46, which are mounted and fastened to the left and right mold segments 22 and 24 and to the left and right base frames 14 and 16 as shown. Accordingly, the X axis motion of each of the left and right mold segments 22 and 24 is independently controllable, and the Y axis motion of each of the rear and front mold segments 26, 28, 30, 32 is independently controllable.

Shown in FIG. 3A, positioned just below the open mold cavity 34, is a four way spreader device defined partially by four vertically disposed spreader pins 48. Two-way spreader devices are well known in the art of blow molding machine design. The four-way spreader, however, provides four spreader pins, instead of two, that are movable radially outwardly with respect to one another. Accordingly, the four-way spreader provides more of a 360 degree contact with an article, compared with the 180 degree contact of two-way spreaders of the prior art.

Positioned centrally of and just below the four-way spreader is a blow pin device 50. Blow pin devices are generally known in the art for communicating a gas under pressure with the interior of an article to be blow molded within the mold cavity of a blow mold. With the present invention, however, the blow pin device 50 includes a socket 52, or a gripper device, for releasably holding a carrier 54 thereon.

The carrier 54 is an assembly that includes a main structural member and a plurality of components thereon, wherein the assembly is ultimately received within a final blow molded article. As defined herein, however, the carrier 54 may be any type of separate component or sub-assembly that is suitable for insertion within a vessel or other blow molded article. The carrier 54 may also function as a baffle or divider plate, which divides the volume of a finished, blow-molded, vessel into smaller portions and eliminates or reduces surging or splashing of large amounts of liquid within the finished vessel. Advantageously, the carrier 54 is at least locally connected, and preferably bonded or welded, to the inside of the finished vessel. To this end, the carrier 54 may have a plurality of feet or connecting elements (not shown) spaced along its edges, which consist of a plastic material that is weldable or bondable to the inside of the finished vessel. The remainder of the carrier 54 may therefore consist of a plastic material, which is not weldable or bondable to the material of the tank, or it may consist of a metal. The carrier 54 is similar to that disclosed in U.S. Patent Application Publication 2001/0013516, which is assigned to the assignee hereof and is incorporated herein by reference.

Finally, a parison 56 is shown in cross-section and encircles the four way spreader. The parison 56 is preferably a molten, plastic, tubular preformed article. The parison 56 preferably comprises a plurality of layers of different thermoplastic polymer materials that are simultaneously extruded. For example, in a six layer co-extrusion of the parison 56 for making a vehicle fuel tank, the parison 56 has inner and outer structural layers of polyethylene (such as HDPE), and may have a layer of so-called "re-grind" or recycled scrap material between the outer layers, and a fuel vapor barrier layer (of ethylene vinyl alcohol or other polymer resistant to fuel vapor permeation) that is sandwiched between two adhesive layers which connect the vapor barrier layer to the structural polymeric layers of re-grind and/or virgin HDPE.

Figure 3B:
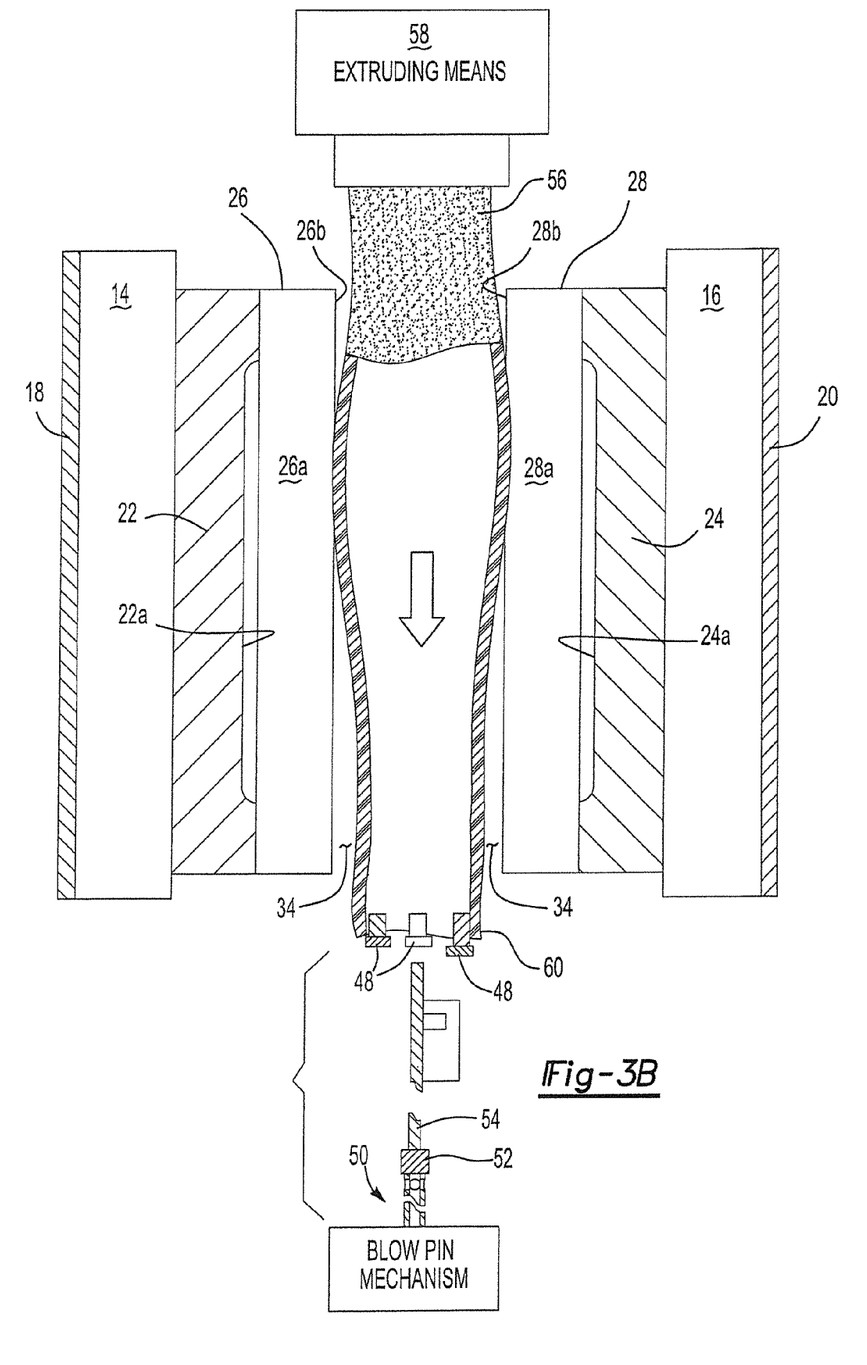
FIG. 3B is a partial cross-sectional view of the blow molding apparatus of FIG. 3A along lines 3B-3B, illustrating spreader pins engaging a lower portion of a parison.

FIG. 3B illustrates a cross-sectional view of the blow molding apparatus 10 of FIG. 3A, taken along line 3B-3B. The open mold cavity 34 is partially defined by the mold surfaces 22a, 24a, 26a, 28a of the various mold segments 22, 24, 26, 28. The blow pin device 50 and carrier 54 are shown in a fully lowered or retracted position.

In a method according to one embodiment of the present invention, an extruder 58 produces the molten parison 56. The extruder 58 is preferably a co-extrusion device, which is well known in the art. The extruder 58 essentially processes an input of plastic pellets to form an output of a co-extruded tubular preform of hot plastic, otherwise known as the parison 56. The parison 56 may be gravity fed directly to the open mold cavity 34 between or amongst the various mold segments 22, 24, 26, 28, 30, 32. Alternatively, the parison 56 may be gripped by a transfer mechanism (not shown), torn from the extruder 58, and transported into the open mold cavity 34 for blow molding into a finished article or vessel, such as a fuel tank. In any case, the parison 56 is lowered to a point where a lower end 60 of the parison 56 encircles the spreader pins 48, which are in a closed or retracted position.

Figure 3C:
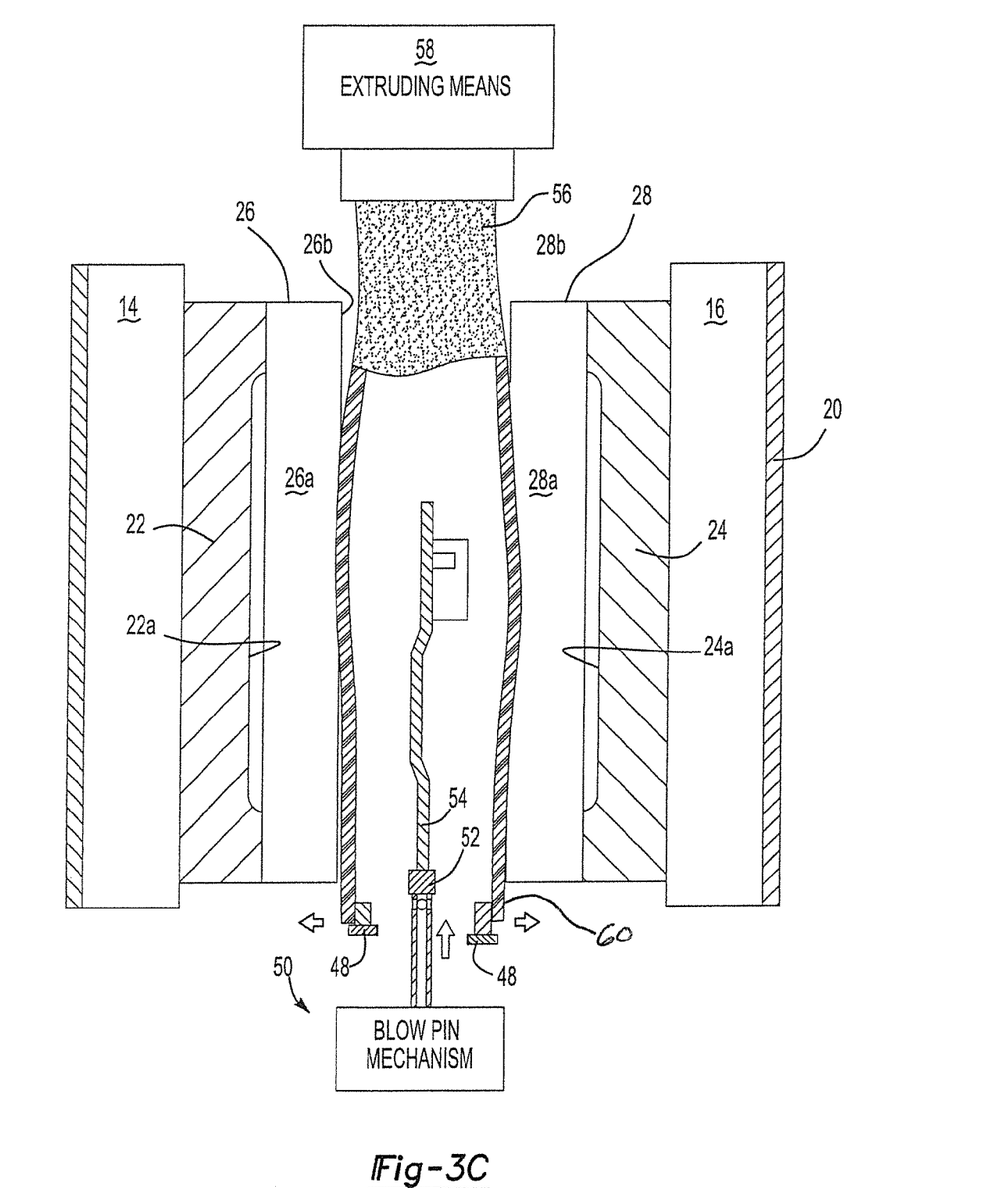
FIG. 3C is a partial cross-sectional view of the blow molding apparatus of FIG. 3A, illustrating the spreader pins fully extended and a blow pin mechanism and a carrier extending up into the parison.

As shown in FIG. 3C, the spreader pins 48 are positioned within the lower end 60 of the parison 56. It is contemplated that the spreader pins 48 can extend vertically upward deep into the interior of the parison if desired. In any case, the spreader pins 48 are moved laterally apart, or radially outwardly. Accordingly, the spreader pins 48 spread out the lower end 60 of the parison 56 to better distribute the parison material within the mold and to further open at least the lower portion of the parison 56.

Preferably after the four-way spreader has spread or opened the parison 56, the blow pin device 50 and carrier 54 are extended upwardly into the parison 56 to an advanced position within the mold. The carrier 54 may be loaded into the socket 52 of the blow pin device 50 manually or automatically, such as by a robot (not shown). Blow pin devices 50 and the means for advancing blow pin devices are generally well known in the art of blow molding. The present invention, however, contemplates the use of rodless pneumatic cylinders, or pneumatic hollow rod cylinders such as HEB brand cylinders, in order to provide the blow pin advancing motion. The hot parison 56 is somewhat molten, flexible and sticky, so care must be taken to maintain the parison 56 separate or spaced from the carrier 54. Ordinarily, a supply of pressurized air may be provided into the parison 56 to maintain it open and prevent it from collapsing or otherwise engaging the carrier 54 prior to closing the mold. However, such a pre-blowing step is usually not necessary when using the four equidistantly spaced spreader pins 48 of the four-way spreader device, which sufficiently keeps the parison 56 opened to prevent contact with the carrier 54.

Figure 4:
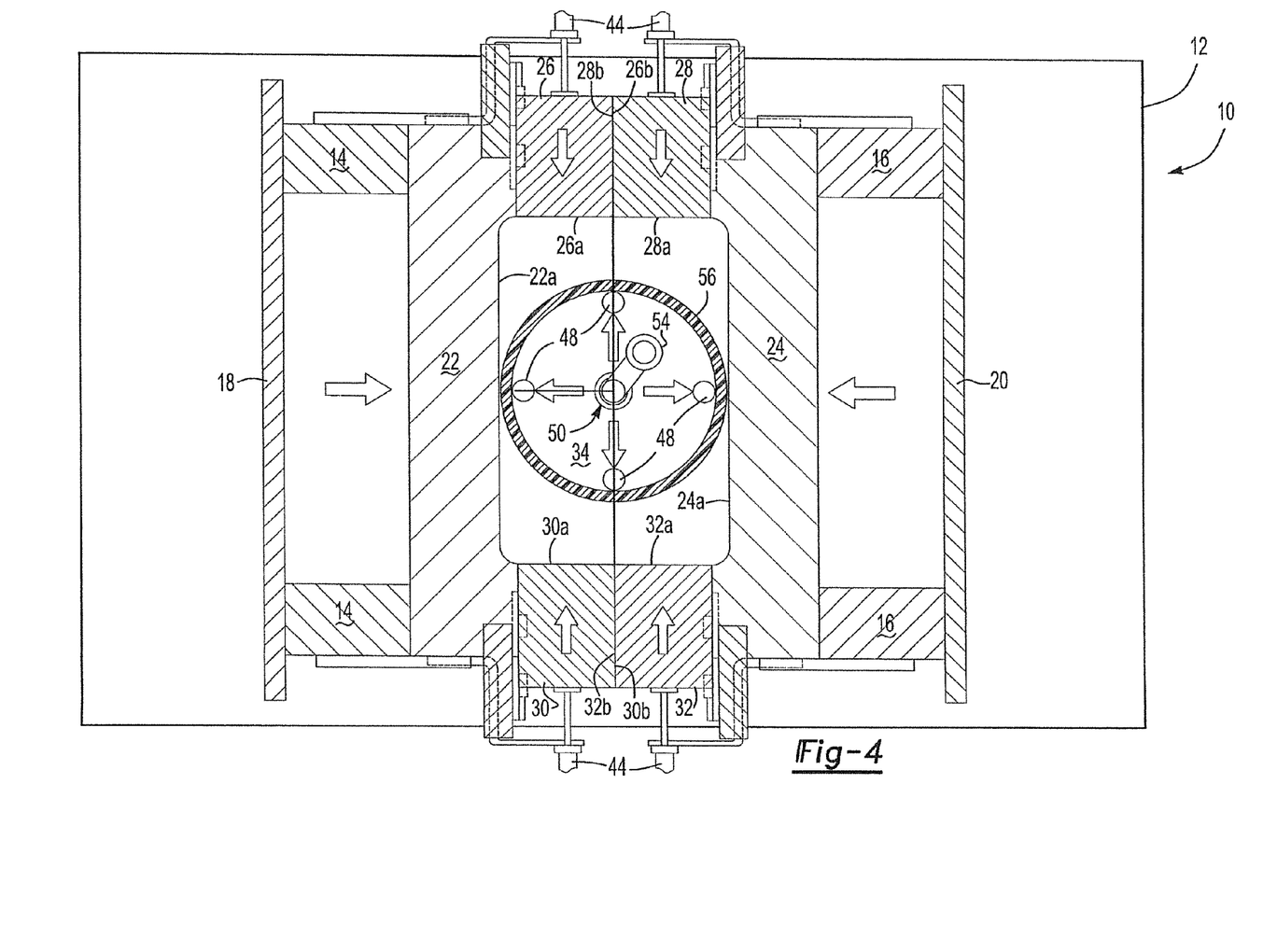
FIG. 4 is a cross-sectional view of the blow molding apparatus of FIG. 3A in a closed or advanced position with the parison fully spread by the spreader pins.

Preferably, when the blow pin device 50 and carrier 54 are extended to the fully advanced position, the mold closes. Accordingly, FIG. 4 illustrates the blow molding apparatus 10 in an advanced or completely closed position, wherein the left and right mold segments 22 and 24, and the upper and lower mold segments 26, 28, 30, 32 have been advanced inwardly toward the now spread out parison 56. Preferably, the left and right mold segments 22 and 24 are advanced to a closed position first, and then the rear and front mold segments 26, 28, 30, 32 are advanced to their closed positions although they could be closed in the reverse order. Alternatively, all of the mold segments 22, 24, 26, 28, 30, 32 may be advanced simultaneously so as to provide simultaneous circumferential closure of the mold around the parison 56.

The mold is closed when the abutment surfaces 26b and 28b of the rear mold segments 26 and 28 abut one another and when abutment surfaces 30b and 32b of the front mold segments 30 and 32 abut one another. Closure of the mold traps the parison 56 and closes its ends with the blow pin device 50 extending into the parison 56 within the mold cavity 34. Preferably, the left and right mold segments 22 and 24 include a sealing aperture (not shown) for engaging and sealing around a portion of the blow pin device 50. As is well known in the art of blow molding, a portion of the extruded parison 56 is severed between the top of the mold and the bottom of the extruder and another portion is severed below the bottom of the mold, such that the parison 56 remains intact within the mold and is sealed by the mold.

Desirably, as the mold is closed, the parison 56 engages feet (not shown) of the carrier 54 to limit or prevent relative movement between the carrier 54 and the parison 56. To adhere to the parison 56, the feet are preferably a polymeric material directly bondable to the innermost layer of the parison 18, such as HDPE or re-grind material. The remainder of the carrier 54 can be made out of any material suitable for use in the liquid fuel to be stored in the tank, including without limitation, metals and polymers such as HDPE or re-grind material.

Figure 5A:
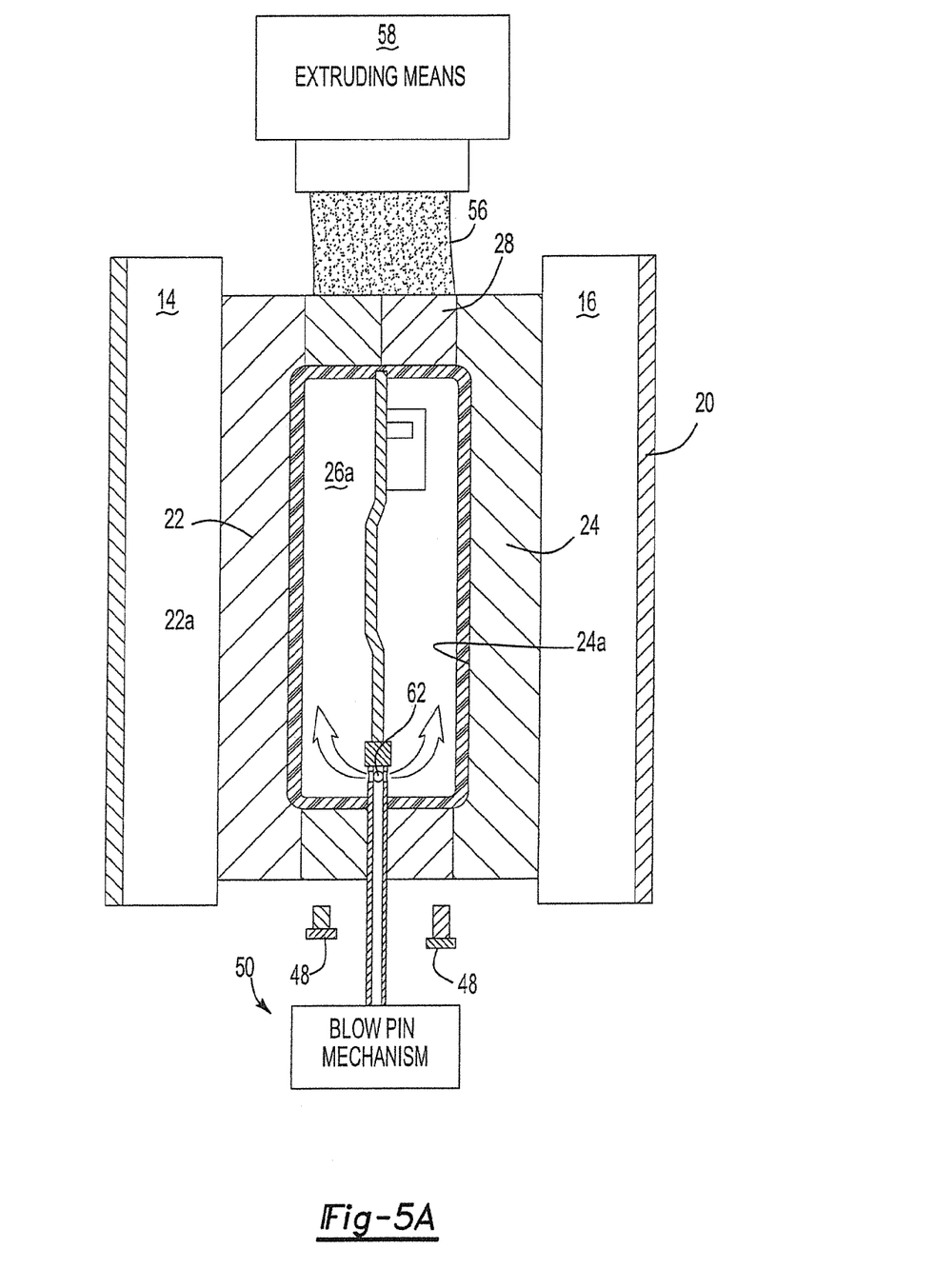
FIG. 5A is a partial cross-sectional view of the blow molding apparatus of FIG. 3A, illustrating gas being injected through the blow pin to fully expand the parison.

As shown in FIG. 5A, with the parison 56 positioned within the closed mold, pressurized air may be provided through apertures 62 of the blow pin device 50 to expand the parison 56 into engagement with the various mold surfaces in order to form the final shape of the finished blow molded article. The pressurized air may be at a pressure of about 10 bar and, to facilitate cooling the parison 56 (which may be extruded at about 250 degrees Celsius), the mold may be chilled to about 10 degrees Celsius using standard cooling passages formed within the various mold segments.

Figure 5B:
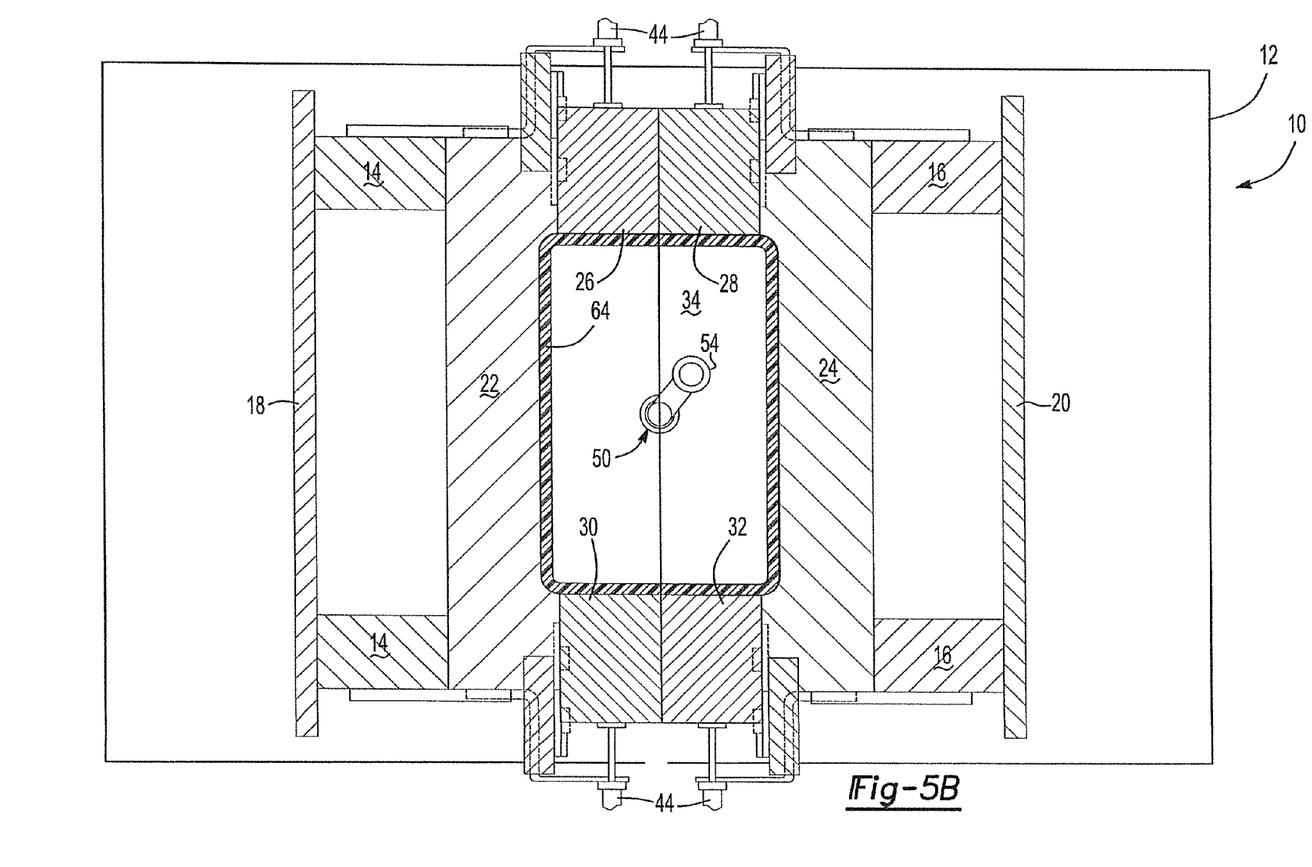
FIG. 5B is a cross-sectional view of the blow molding apparatus of FIG. 3A, illustrating the parison being fully blown into final position.

FIG. 5B illustrates the parison fully blown and shaped into a final molded article 64 within the closed mold. After the blow molded article 64 has cooled sufficiently to retain its shape, the supply of pressurized air is turned off, the blow pin device 50 withdrawn, the mold opened, and the blow molded article 64 removed.

Figure 6:
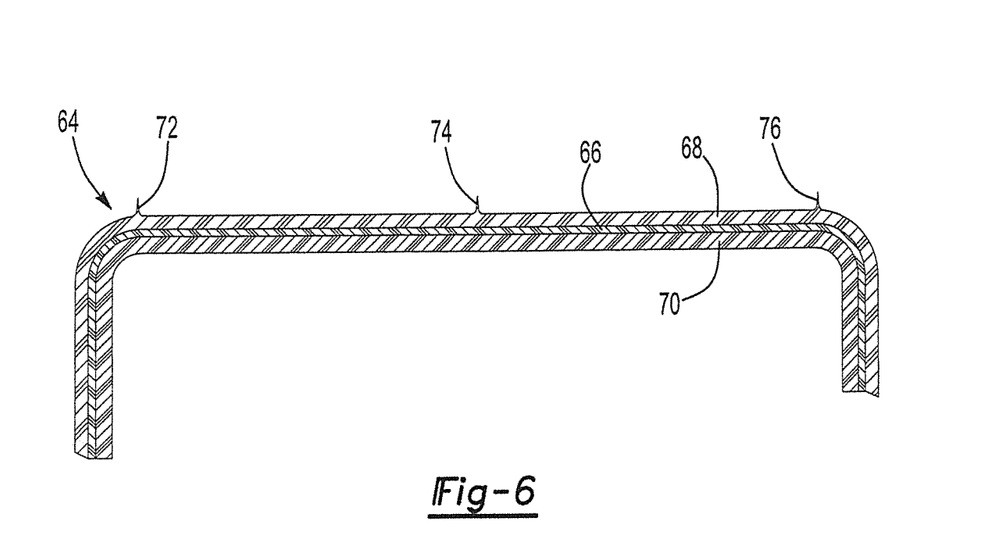
FIG. 6 is a partial cross-sectional view of a blow molded component produced by the apparatus of the present invention and/or in accordance with the method of the present invention.

FIG. 6 illustrates a partial cross-sectional view through the wall of the molded article 64. The molded article 64 is a multi-layer component as described above and preferably includes six layers. For simplicity, the wall is shown as including a sensitive inner membrane 66 that is sandwiched between an outer layer 68 and an inner layer 70. For exemplary purposes, and referring to FIG. 6 and FIG. 3A, the parting line 72 results from the interface of the sliding surfaces 22r and 26d of the left mold segment 22 and rear left mold segment 26. Similarly, parting line 74 results from the interface of the abutment surfaces 26b and 28b of the rear mold segments 26 and 28. Likewise, parting line 76 results from the interface of the sliding surfaces 28d and 24r of the rear right mold segment 28 and the right mold segment 24. Unlike prior art molding apparatuses and methods, however, the present invention does not result in large parting lines that yield ruptures in the inner membrane 66. Accordingly, the present invention enables fuel tanks to be blow molded without compromising the structural integrity of the layers thereof. In other words, the present invention yields fuel tanks in which the barrier layer 66 is imperforate so that no hydrocarbons can escape through any breaches or voids in the fuel tank wall.

FIGS. 7 through 11 illustrate another exemplary embodiment of the present invention. This embodiment is similar in many respects to the embodiment of FIGS. 3A-5B and like numerals between the embodiments designate like or corresponding elements throughout the several views of the drawing figures. Accordingly, the common subject matter between the embodiments will generally not be repeated here.

Figure 7:
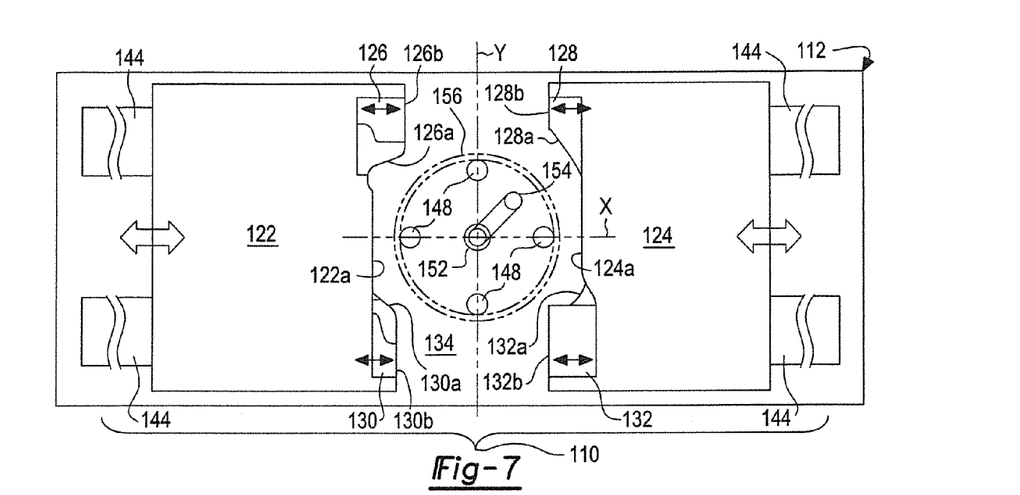
FIG. 7 is a top view of a parison positioned within a blow molding apparatus according to another exemplary embodiment of the present invention.

FIG. 7 illustrates a blow molding apparatus 110 that is constructed for use with a blow molding machine 112. The blow molding apparatus 110 is depicted in plan view, looking downward along a Z axis or direction with an X axis extending left to right and a Y axis extending rear to front. As used herein, the term axis includes the term direction. As with the previously discussed embodiment, the blow molding apparatus 110 may include left and right base frames (not shown) that are attached to left and right movable platens or mold closers (not shown) of the blow molding machine 112. Also like the previous embodiment, the blow molding apparatus 110 includes a plurality of movable mold closures or segments 122, 124, 126, 128, 130, 132, which are shown in FIG. 7 in a retracted or open position.

The plurality of movable mold segments includes a first pair of mold closures that are substantially opposed to one another including a left mold segment 122 mounted on the left base frame and a right mold segment 124 mounted on the right base frame. Accordingly, the mold closers of the molding machine are capable of traversing the left and right mold segments 122 and 124 between open and closed positions along the X axis.

A second pair of mold closures includes rear and front left mold segments 126 and 130, which are slidably mounted to the left segment 122, and a third pair of mold closures includes rear and front right mold segments 128 and 132, which are slidably mounted to the right segment 124. In contrast to the previous embodiment, wherein like opposed pairs of mold segments traverse along the Y axis, here the rear and front mold segments 126, 128 and 130, 132 are slidable between open and closed positions along the X axis. In other words, the rear and front mold segments 126, 128 and 130, 132 move along substantially the same axis as the left and right mold segments 122, 124. The rear and front mold segments 126, 128 and 130, 132 need not be mounted to their respective left and right mold segments 122 and 124, but instead could be separately mounted to the blow molding machine 112. In any case the second pair of mold closures is substantially opposed to the third pair.

Each of the left and right mold segments 122 and 124 includes mold surfaces 122*a* and 124*a*, which partially define a mold cavity 134. The mold cavity 134 is further defined by mold surfaces 126*a*, 128*a*, 130*a*, and 132*a* of respective mold segments 126, 128, 130, 132. Likewise, all of the mold segments 122, 124, 126, 128, 130, 132 collectively define a mold of the present invention. The rear and front mold segments 126, 128, 130 and 132 also include abutment surfaces 126*b*, 128*b*, 130*b*, and 132*b*; driven surfaces (not shown) and sliding surfaces (not shown). Likewise, the left and right mold segments 122 and 124 include sliding surfaces (not shown) for respective sliding engagement with the sliding surfaces of the rear and front mold segments 126, 128, 130, and 132. In other words, the rear and front mold segments 126, 128, 130, and 132 are adapted for slidable mounting with respect to the left and right mold segments 122 and 124.

In general, slidable mounting arrangements are well known to those of ordinary skill in the art in machine tool design and any suitable arrangement may be used. The rear mold segments 126 and 128, and the front mold segments 130 and 132, are independently, slidably mounted to respective portions of the left and right mold segments 122 and 124 using an interlocking guide rail arrangement, as previously described with reference to the previous embodiment. Accordingly, the rear and front mold segments 126, 128, 130, 132 are independently slidable side to side along the X axis. To slide the rear and front mold segments 126, 128, 130, 132 along the X axis hydraulic cylinders 144 are mounted to the segments 126, 128, 130, 132, preferably by a clevis arrangement (not shown), as with the previously described embodiment. Accordingly, the X axis motion of each of the left and right mold segments 122 and 124 is independently controllable, and the X axis motion of each of the rear and front mold segments 126, 128, 130, 132 is independently controllable.

Also shown in FIG. 7, positioned just below the open mold cavity 134, is a four way spreader device defined partially by four vertically disposed spreader pins 148. Positioned centrally of and just below the four-way spreader is a blow pin device 150. including a socket 152, or a gripper device, for releasably holding a carrier 154 thereon. Finally, a parison 156 is shown in phantom lines and encircles the four way spreader.

Figure 8:
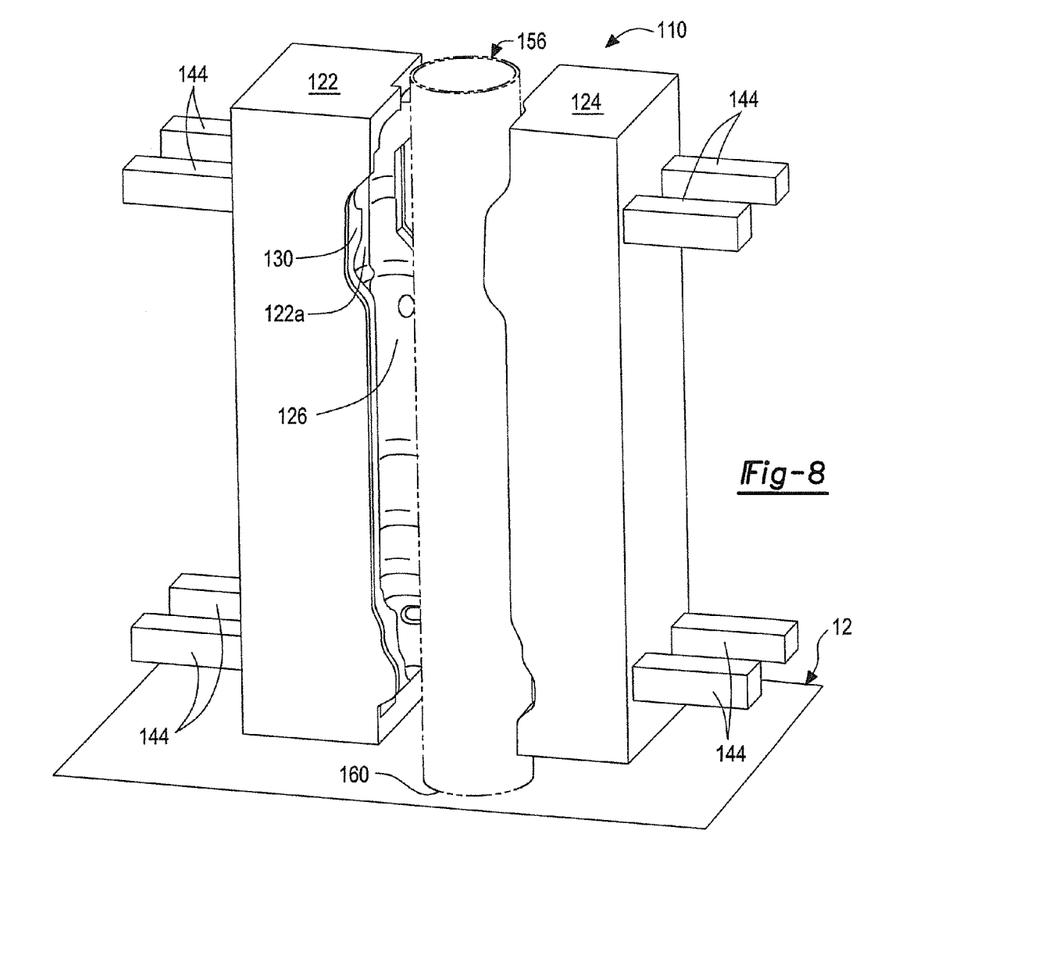
FIG. 8 is a front perspective view of the blow molding apparatus of FIG. 7.

Referring now to FIGS. 7 and 8 and to a method according to this embodiment of the present invention, an extruder (not shown) produces the parison 156, which may be gravity fed directly to the open mold cavity 134 between or amongst the various mold segments 122, 124, 126, 128, 130, 132. Alternatively, the parison 156 may be gripped by a transfer mechanism (not shown), torn from the extruder, and transported into the open mold cavity 134 for blow molding into a finished article or vessel, such as a fuel tank. In any case, the parison 156 is lowered to a point where a lower end 160 of the parison 156 encircles the spreader pins (not shown), which are in a closed or retracted position. The spreader pins are positioned within the lower end 160 of the parison 156 and are moved laterally apart, or radially outwardly. Accordingly, the spreader pins spread out the lower end 160 of the parison 156 to better distribute the parison material within the mold and to further open at least the lower end 160 of the parison 156. Preferably after the four-way spreader has spread or opened the parison 156, the blow pin device (not shown) and carrier (not shown) are extended upwardly into the parison 156 to an advanced position within the mold. Preferably, when the blow pin device and carrier are extended to the fully advanced position, the mold closes.

Figure 9:
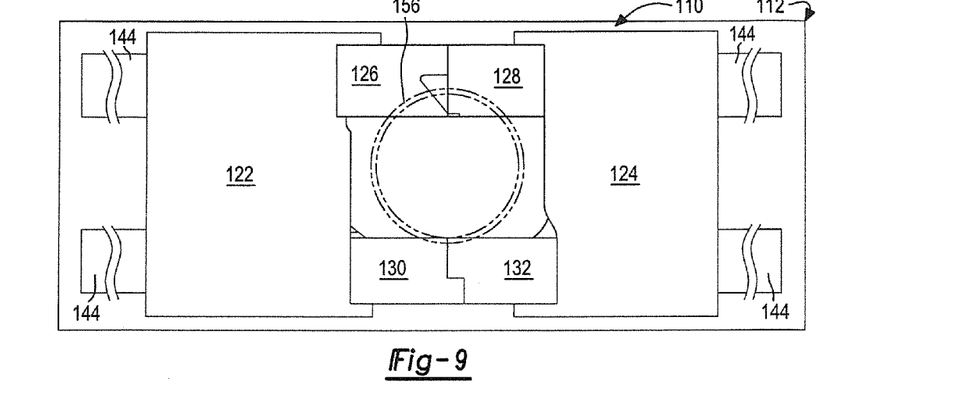
FIG. 9 is a top view of the parison positioned within the blow molding apparatus of FIG. 7.
Figure 10:
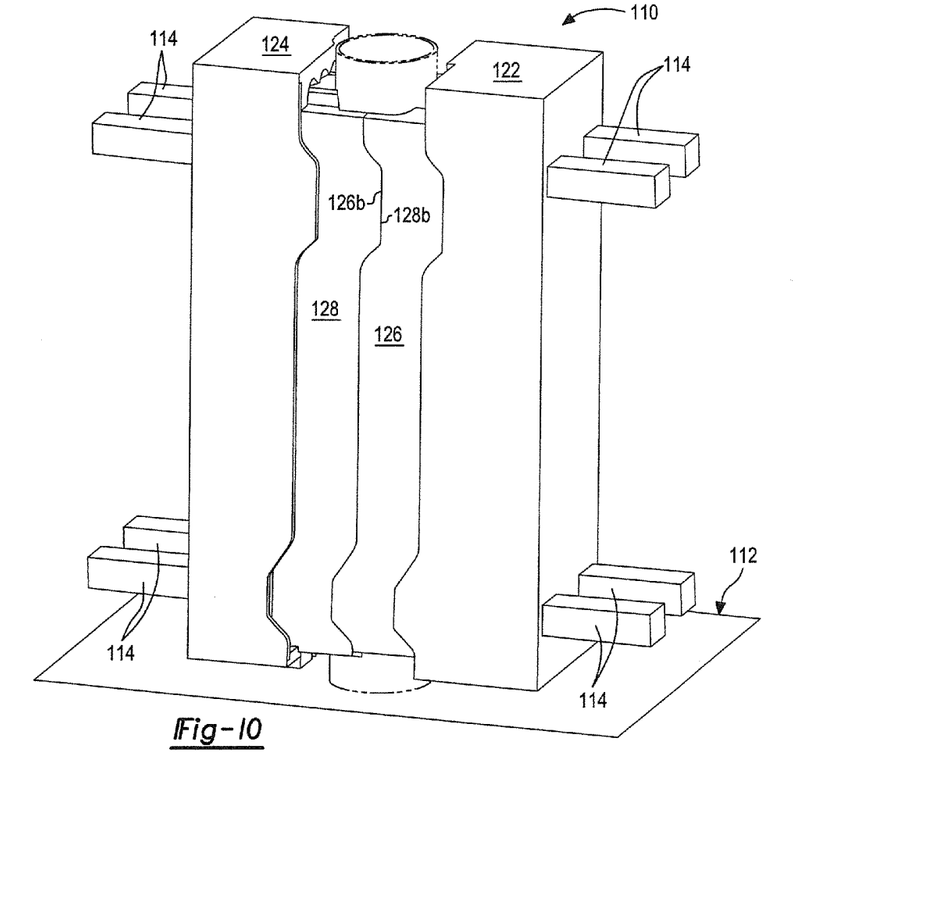
FIG. 10 is a rear perspective view of the blow molding apparatus of FIG. 9.

FIGS. 9 and 10 illustrate the blow molding apparatus 110 in an advanced position, wherein the rear and front mold segments 126, 128, 130, 132 have been advanced inwardly toward the parison 156. Preferably, the rear and front mold segments 126, 128, 130, 132 are advanced to their closed positions first, and then the left and right mold segments 122 and 124 are advanced to a closed position, although they could be closed in the reverse order. Alternatively, all of the mold segments 122, 124, 126, 128, 130, 132 may be advanced simultaneously so as to provide simultaneous circumferential closure of the mold around the parison 156. Once the rear and front mold segments 126, 128, 130, 132 abut or are closed respectively against one another as shown, the hydraulic pressure in the associated hydraulic cylinders 144 sharply rises or peaks.

Figure 11:
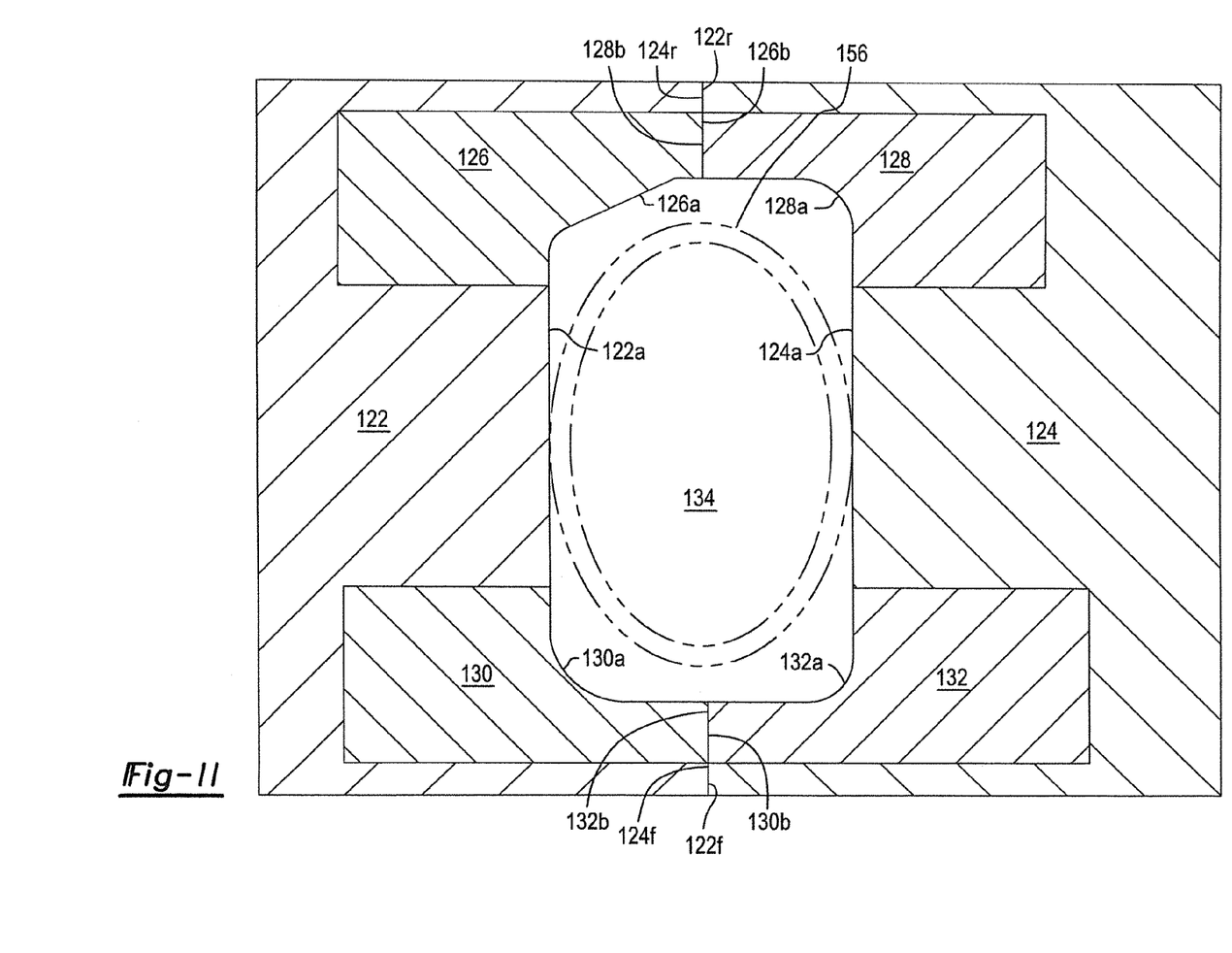
FIG. 11 is a cross-sectional view of the blow molding apparatus of FIG. 7 illustrating a fully closed position.

When the hydraulic pressure peaks, the left and right mold segments 122, 124 advance to close the mold, as better depicted in the cross-sectional view of FIG. 11, wherein the left and right mold segments 122, 124 may include abutment surfaces 122*r*, 122*f*, 124*r*, 124*f* that act as respective opposed stops to stop travel of the mold segments 122, 124. The present invention contemplates, however, that the left and right mold segments 122, 124 need not abut to define a closed mold condition. In other words, the mold may be considered "closed" at any predetermined point after the abutment surfaces 126*b* and 128*b* of the rear mold segments 126 and 128 abut one another and when abutment surfaces 130*b* and 132*b* of the front mold segments 130 and 132 abut one another.

Closure of the mold traps the parison 156 and closes its ends with the blow pin device (not shown) extending into the parison 156 within the mold cavity 134. A portion of the extruded parison 156 is severed between the top of the mold and the bottom of the extruder and another portion is severed below the bottom of the mold, such that the parison 156 remains intact within the mold and is sealed by the mold. With the parison 156 positioned within the closed mold, pressurized gas, such as air, may be provided through the blow pin device to expand the parison into engagement with the various mold surfaces in order to form the final shape of the finished blow molded article. The parison is fully blown and shaped into a final molded article within the closed mold. After the blow molded article has cooled sufficiently to retain its shape, the supply of pressurized air is turned off, the blow pin device withdrawn, the mold opened, and the blow molded article removed.

Figure 12:
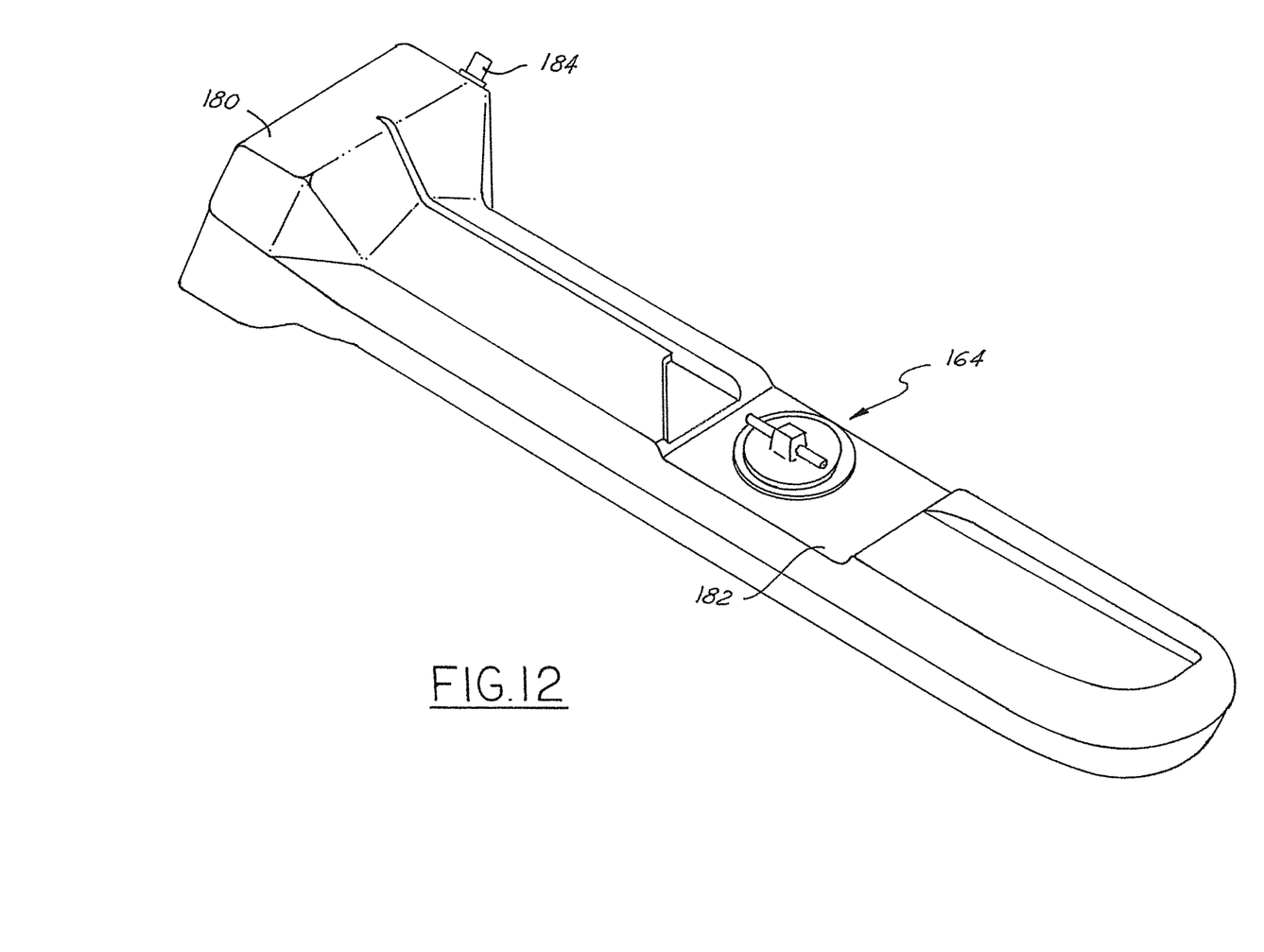
FIG. 12 is a perspective view of a fuel tank as an exemplary article of manufacture that may be produced by one or more exemplary methods according to the present invention.

As depicted by FIG. 12, with this invention it is now possible to integrally blow mold a bulbous or hollow flange portion 180 and a narrower portion 182 of a relatively narrow and generally tubular or cylindrical hollow vessel such as a "cigar-shaped" fuel tank 164. The flange portion 180 is adapted to be a fuel inlet portion of the tank 164, wherein a fuel inlet 184 is mounted thereto. The narrower portion 182 is adapted to be packaged in a tunnel along a centerline, and between seats, of a vehicle to which the tank 164 is assembled. The difference in size or "diameter" between the flange portion 180 and the narrower portion 182 is at least about 2:1. The sliding mold segments of the present invention are capable of opening or retracting along multiple axes, which facilitates use of a relatively larger parison than before possible. In turn, using a larger parison translates into a reduced stretch ratio when blow molding the parison. This is because the larger parison can be sized to approximate the size of the interior of a narrower portion of the mold cavity compared to a relatively larger flange portion of the mold cavity. The narrower portion of the mold cavity is used to mold the narrower portion of the tank 164 and the larger flange portion of the mold cavity is used to mold the flange portion 180 of the tank 164.

Accordingly, the difference in diameter between the larger flange portion of the mold cavity and the narrower portion of the mold cavity may be about 2:1. In accordance with the present invention, a portion of the larger parison is expanded very little or just enough to engage the narrower portion of the mold cavity, and another portion of the larger parison is expanded in accordance with a standard, acceptable stretch ratio to engage the larger flange portion of the mold cavity. In other words, and as an example, the larger parison may undergo a stretch ratio of about 1:1 in the narrower portion of the mold cavity and a stretch ratio of about 2:1 in the larger flange portion of the mold cavity. This relatively low stretch ratio ensures that the material being blow molded has a relatively uniform wall thickness and does not rupture or become too thin.

In contrast, with conventional two-piece molds and using conventional blow molding methods, such a configuration would require much larger differences in stretch ratios between a relatively narrow portion of a mold cavity and a relatively larger flange portion of a mold cavity. For example, a conventional approach would require using a relatively smaller parison that would undergo a stretch ratio of about 1:1 to 2:1 in the narrower portion of the mold and a stretch ratio of about 3:1 to 2:1 in the larger flange portion of the mold. Thus, the present invention provides a significant improvement in the art of blow molding that yields lower stretch ratios and more uniform wall thickness of blow molded components, and that avoids excessive flash and rupturing of sensitive inner membranes.

Using movable mold segments that traverse in a plurality of generally transverse axes, permits using a larger parison, which in turn, accommodates use of a "Ship-in-a-Bottle" fuel tank and carrier design. A larger parison has a larger internal diameter, which facilitates inserting larger carriers therein during a blow molding process. In the past, it has sometimes been required to manufacture a fuel tank from two half-shells in order to accommodate assembly of a carrier or large components within the fuel tank. Such fuel tank manufacturing techniques tend to be more difficult and costly than fuel tank blow molding techniques and tend to have unacceptably high hydrocarbon permeation losses. Thus, the present invention provides a method of blow molding fuel tanks that is less expensive than prior art methods and that results in a fuel tank with comparably higher structural integrity and significantly lower hydrocarbon permeation losses.

While the forms of the invention herein disclosed constitute a presently preferred embodiment, many others are possible. For instance, the mold segments may be independently arranged and not mounted to one another, and the mold segments may move in oblique axes other than the perpendicularly oriented X and Y axes. It is not intended herein to mention all the possible equivalent forms or ramification of the invention. It is understood that terms used herein are merely descriptive, rather than limiting, and that various changes may be made without departing from the spirit and scope of the invention as defined by the following claims.

The invention claimed is:

1. An apparatus for blow molding a finished article from a preformed heated parison, said apparatus comprising:
   first and second opposed mold closures, said first and second opposed mold closures each having a mold cavity surface and moving between an open position and a closed position along a first axis;
   a first pair of mold segments each translatably mounted to said first opposed mold closure and moving along a second axis substantially perpendicular to the first axis, said first pair of mold segments each having an abutment surface lying generally transverse to the first axis and having a separate mold cavity surface; and
   a second pair of mold segments each translatably mounted to said second opposed mold closure and moving along a third axis generally parallel to the second axis, said second pair of mold segments opposing said first pair of mold segments, and said second pair of mold segments each having an abutment surface lying generally transverse to the first axis and having a separate mold cavity surface,
   wherein a closed mold cavity is formed by moving the first and second opposed mold closures together along the first axis so as to close the first and second opposed mold closures and so that abutment surfaces of the first pair of mold segments abut with abutment surfaces of the second pair of mold segments and also by moving each segment of the first pair of mold segments toward one another along the second axis and each segment of the second pair of mold segments toward one another along the third axis,
   wherein said closing is conducted without pinching the parison between any of the entirety of the abutment surfaces so that the parison is subsequently blow molded against the entirety of the mold cavity surfaces within the closed mold cavity without forming excessive flash, and
   wherein the first, second, and third axes are separate from one another.

2. The apparatus of claim 1 wherein the first pair of mold segments and the second pair of mold segments move along the second and third axes respectively from a retracted or open position to an advanced or closed position.

3. The apparatus of claim 1 further comprising a blow pin configured to receive a carrier assembly and movable to an extended position to dispose the carrier assembly within the parison before the closed mold cavity is formed.

4. The apparatus of claim 3 wherein the blow pin is configured to inject a pressurized gas into the interior of the parison when the closed mold cavity is formed.

5. The apparatus of claim 1 wherein the closed mold cavity is constructed and arranged so that when the parison is blow molded against the entirety of the mold cavity surfaces, the parison undergoes a stretch ratio of about 1 to 1 to form a narrower portion of the blow molded article and another stretch ratio of about 2 to 1 to form a larger portion of the blow molded article.

6. An apparatus for blow molding a finished article from a preformed heated parison, said apparatus comprising:

first and second opposed mold closures, said first and second opposed mold closures each having a mold cavity surface and moving between an open position and a closed position along a first axis;

first and second opposed mold segments translatably mounted to the first and second opposed closure respectively, said first and second opposed mold segments moving along a second axis substantially parallel to the first axis, and said first and second opposed mold segments each having an abutment surface lying generally transverse to the first axis and having a separate mold cavity surface; and third and fourth opposed mold segments translatably mounted to the first and second opposed mold closure respectively, said third and fourth opposed mold segments moving along a third axis substantially parallel to the first and second axes, and said third and fourth opposed mold segments each having an abutment surface lying generally transverse to the first axis and having a separate mold cavity surface, wherein a closed mold cavity is formed by moving the first and second opposed mold closures together along the first axis so as to close the first and second opposed mold closures and also by moving each of the first and second opposed mold segments together along the second axis and each of the third and fourth opposed mold segments together along the third axis, independently of said moving of the first and second opposed mold closures together, so that abutment surfaces of the first and third mold segments abut with abutment surfaces of the second and fourth mold segments respectively, wherein said closing is conducted without pinching the parison between any of the entirety of the abutment surfaces so that the parison is subsequently blow molded against the entirety of the mold cavity surfaces within the closed mold cavity without forming excessive flash, and wherein the first, second, and third axes are separate from one another.

7. The apparatus of claim 6 wherein both the first and second opposed mold segments and the third and fourth opposed mold segments move along the second and third axes respectively from a retracted or open position to an advanced or closed position.

8. The apparatus of claim 6 further comprising a blow pin configured to receive a carrier assembly and movable to an extended position to dispose the carrier assembly within the parison before the closed mold cavity is formed.

9. The apparatus of claim 8 wherein the blow pin is configured to inject a pressurized gas into the interior of the parison when the closed mold cavity is formed.

10. The apparatus of claim 6 wherein the closed mold cavity is constructed and arranged so that when the parison is blow molded against the entirety of the mold cavity surfaces, the parison undergoes a stretch ratio of about 1 to 1 to form a narrower portion of the blow molded article and another stretch ratio of about 2 to 1 to form a larger portion of the blow molded article.

* * * * *